United States Patent [19]

Kassai

[11] Patent Number: 4,567,964
[45] Date of Patent: Feb. 4, 1986

[54] WHEEL STOPPING DEVICE

[75] Inventor: Kenzou Kassai, Osaka, Japan

[73] Assignee: Kassai Kabushikikaisha, Osaka, Japan

[21] Appl. No.: 627,789

[22] Filed: Jul. 5, 1984

[30] Foreign Application Priority Data

Jul. 8, 1983 [JP] Japan ................. 58-125272

[51] Int. Cl.⁴ ............................................... B62B 9/08
[52] U.S. Cl. ....................................... 188/20; 280/642
[58] Field of Search ................. 188/20, 2 D, 2 F, 16, 188/19, 21–23, 24.16, 46, 105, 106 R, 112, 346, 141, 265, 204 R, 217; 280/47, 38, 642, 644; 303/6 A

[56] References Cited

U.S. PATENT DOCUMENTS 2,014,085  9/1935  Kroll et al. ............................ 188/20
2,100,036 11/1937  Michal .................................. 188/20
2,480,431  8/1949  Welsh ................................... 188/20

Primary Examiner—Douglas C. Butler
Attorney, Agent, or Firm—W. G. Fasse; D. H. Kane, Jr.

[57] ABSTRACT

Wheels (11, 11a) which are rotatably attached, for example, to the two rear legs (3, 3a) of a baby carriage, are brought into a stopped or locked state or the rotation of the wheels is permitted by an operation of a single operating member (25). Wheel stopping mechanisms (11, 11a) respectively associated with the wheels (11, 11a), are interlocked by a wire (26) for transmitting the operation of an operating member from one wheel stopping mechanism to the other.

10 Claims, 15 Drawing Figures

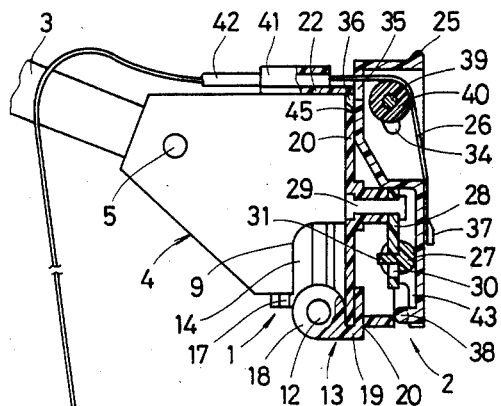

WHEEL STOPPING DEVICE

BACKGROUND OF THE INVENTION

This invention relates to a wheel stopping device and particularly to improvements in a wheel stopping device constructed to be attached to wheels of a baby carriage, for example, for selectively maintaining the stopped state.

A baby carriage, for example, is desirably provided with a wheel stopping device whereby the baby carriage is inhibited from starting to move under its own weight as on a sloping road. It is desired that such wheel stopping device, which is manipulated as needed be simple in operation. Further, the wheel stopping device is closely related to the safety of baby carriages, and it is desirable that it be constructed so that with respect to baby carriage wheels disposed at two different places, e.g., right and left rear wheels, the device is capable of maintaining the stopped state of the wheels. This is even a legal obligation in some countries.

In the case where the wheel stopping device is constructed to act on wheels disposed at two different places, it is desirable if two such wheel stopping mechanisms disposed at two places can be simultaneously actuated in one operation. When two wheel stopping mechanisms at two places are to be simultaneously actuated, a solution would be to connect them together by a suitable interlocking mechanism. However, if such wheel stopping device is attached to a collapsible baby carriage, the positional relation between the two wheel stopping mechanisms can change with the collapsing operation. In such case, the interlocking mechanism connecting the two wheel stopping mechanisms can interfere with the collapsing movement of the baby carriage; thus, some measure or other must be taken also for such interlocking mechanism.

SUMMARY OF THE INVENTION

Accordingly, an object of this invention is to provide a wheel stopping device wherein in the case where two wheel stopping mechanisms are provided at two places, such wheel stopping mechanisms can be simultaneously actuated in one operation and the interlocking mechanism for the two wheel stopping mechanisms does not interfere with the change in the relative positional relation between the two wheels caused by the collapsing movement of a baby carriage or the like.

In this invention, there is employed an arrangement including first and second engaging shafts movable in parallel relation to the respective axles of first and second wheels disposed at two different places, and first and second ribs extending from the respective lateral surfaces of the first and second wheels, wherein when the first and second engaging shafts are moved toward the first and second ribs for engaging these ribs, respectively, the wheel stopped state is established. Therefore, the wheel rotation permitting state will be obtained by moving the engaging shafts away from the respective ribs. More particularly, the first and second engaging shafts are connected to one of the respective ends of first and second L-levers rotatably supported at first and second wheel attaching members for attaching the first and second wheels. An operating member is movably attached to the first wheel attaching member so that it abuts against the other end of the first L-lever, while the first L-lever is provided with a first spring which urges the first L-lever against the operating member. Thus, with the movement of the operating member, the first L-lever is turned while the first engaging shaft is moved toward and away from the first rib. A wire is used to interlock the two wheel stopping mechanisms. This wire is connected between the operating member and the second L-lever, whereby, the movement of the operating member is transmitted to the second L-lever, whereby, while the second L-lever is turned, the second engaging shaft is moved toward and away from the second rib in synchronism with the first engaging shaft. The second L-lever is provided with a second spring which urges the second L-lever in the direction which imparts tension to the wire.

When the operating member is moved in the direction which turns the first L-lever against the resilience of the first spring, the first engaging shaft is moved away from the first rib, while the force transmitted through the wire turns the second L-lever against the resilience of the second spring, moving the second engaging shaft away from the second rib, whereby the wheel rotation permitting state is established. Since this wheel rotation permitting state must be maintained against the resilience of the second spring, a lock member is provided for locking the operating member to prevent the latter from moving relative to the first wheel attaching member.

On the other hand, when the locking by the lock member is canceled, the first and second engaging shafts are moved toward the first and second ribs by the action of the first and second springs, whereby the wheel stopping state is established.

According to this invention, since the first and second engaging shafts adapted to act on the respective ribs of the first and second wheels are interlocked by a wire through two L-levers and one operating member, by operating the single operating member it is possible to move the first and second engaging shafts in synchronism with each other toward or away from the ribs. Thus, the wheel stopping mechanisms disposed at two places can be simultaneously actuated in a single operation and hence the operations for obtaining the wheel stopped state and the wheel rotation permitted state are facilitated. Further, since the means for connecting the two wheel stopping mechanisms is a wire, there is no possibility of interfering with the change in the relative positional relation between the two wheel stopping mechanisms and hence between the first and second wheels disposed at two different places. Thus, this invention can be advantageously applied to collapsible baby carriages and the like.

According to another aspect of this invention, there is provided a cushioning device for the wheels of a baby carriage.

This cushioning device is characterized by the use of a compression spring which is installed in a state in which it is protected from the outside. More particularly, basically it comprises fixed brackets rigidly attached to leg members of a baby carriage, cylindrical sections formed as portions of said fixed brackets and defining vertically extending bottom-opened spaces, wheel attaching members for holding the axles of wheels, slide portions formed as portions of the wheel attaching members and inserted from below into the spaces of the cylindrical sections so that they are vertically slidable, and coiled compression springs which exert resilient forces between the fixed brackets and the wheel attaching members. The space of each cylindrical section is closed at its upper end by an upper wall, the latter being formed with a throughgoing hole smaller in cross-section than said space and substantially aligned with the central axis of the space. The slide portion comprises a central rod adapted to have its upper end received in said throughgoing hole, a box portion formed around said central rod to define therebetween a top-opened bottom-closed space and disposed in contact with the inner peripheral surface of the cylindrical section, and a stopper for defining the terminal end of the downward movement of the central rod with the upper end of the central rod received in said throughgoing hole, the arrangement being such that when the central rod is brought to the terminal end position in its downward movement, a clearance of predetermined height allowing a cushioning movement is formed between the upper end of the box portion and the lower surface of the upper wall. The compression spring is disposed with its lower end positioned between the central rod and the box portion and with its upper end contacting the lower surface of the upper wall.

According to this cushioning device, a compression spring is used and since it is received in the space defined by the cylindrical section and the slide portion, the compression spring is protected against outside influences and hence will not suffer such troubles as rusting and dirt sticking thereto. Therefore, the cushioning device has a long useful life and the cushioning operation is stabilized. Further, since a long compression spring can be used without encountering such problems as aesthetic degradation and fingers being pinched, the cushioning performance can be enhanced even if a thick spring is used. The use of a thick spring makes it possible to lengthen the life of the device. Further, even if the compression spring should break, this will not lead to a serious accident, since the occurrence of such breakage is only between the cylindrical section and the slide portion while the latter is supported by the former; thus, the device is superior also in safety. Further, the fixed brackets and the wheel attaching members can be easily made of resin materials.

BRIEF DESCRIPTION OF THE DRAWINGS

FIG. 2 is a side view partially, in section, showing the cushioning mechanism, FIG. 3 is a cross-sectional view of the cushioning mechanism 1, and FIG. 4 is a partly sectioned side view illustrating the cushioning movement in comparison with FIG. 2;

FIG. 5 shows the regions around the lower end of the left-hand side rear leg 3a and of the right-hand side rear leg 3 of FIG. 1 and the connection between the right and left wheel stopping mechanisms;

FIG. 6 is a vertical sectional view showing an operating member 25 used in FIG. 5;

FIG. 7 is a partial sectional view as seen from the right-hand side of FIG. 5;

FIG. 13 is a view taken from the right-hand side of FIG. 12, and FIG. 14 is a view taken from the right-hand side of FIG. 12 and showing the wheel stopping state.

DESCRIPTION OF THE PREFERRED EMBODIMENTS

Figure 15:
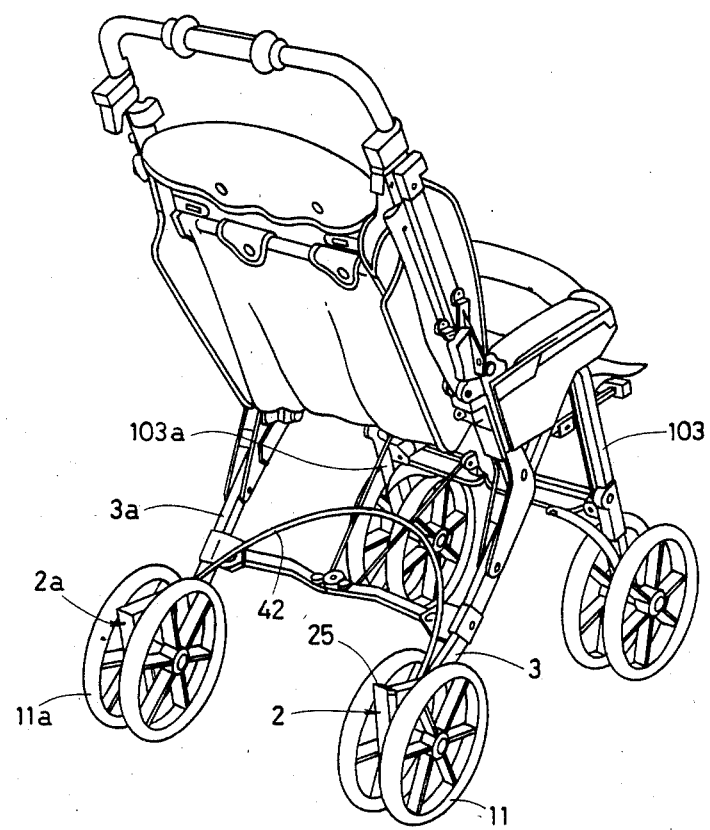
FIG. 15 is a perspective view, taken from the rear, of the entire baby carriage the rear legs 3 and 3a of which are shown in FIG. 5, etc.

The wheel stopping device of this invention is applicable to various types of baby carriages and to any other vehicles and the like having wheels in at least two places. In addition, the embodiment to be described below is an application to a baby carriage having two rear legs. FIG. 15 shows an example of such baby carriage.

The wheel stopping device of this invention, in a baby carriage having two front legs 103 and 103a and two rear legs 3 and 3a, for example, can be installed in connection with a pair of wheels including right and left front wheels, or including right and left rear wheels or including left front and rear wheels, or including right front and rear wheels. However, for the convenience of operation it is preferable to provide the wheel stopping device in connection with the wheels mounted on the rear legs 103 and 103a.

FIGS. 1 to 4 show a region around the lower end of one rear leg of the baby carriage shown in FIG. 15, e.g., the right-hand rear leg 3. In these figures, a cushioning mechanism 1 installed in connection with the wheel stopping mechanism, is mainly shown, the wheel stopping mechanism 2 being attached to the rear of the cushioning mechanism 1. As for the wheel stopping mechanism 2, only its external appearance is shown, the details of its construction being shown in FIGS. 5 to 14 to be described below.

Figure 3:
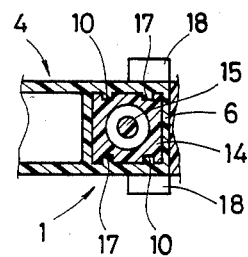

A fixed bracket 4 molded of resin is attached to the lower end of the right-hand rear leg 3 by a fixing pin 5. The rear of the fixed bracket 4 has a vertically extending tubular section 6. The cross-sectional shape of the inner surface of the tubular section 6, as shown in FIG. 3, is substantially square. The upper end of the tubular section 6 is closed by an upper wall 7 having a throughgoing hole 8. The lower end of the tubular section 6 is completely open. The rear lower portion of the tubular section 6 has a notch 9. Further, the inner surface of the tubular section 6, as shown in FIG. 3, has a plurality of ridges 10.

Figure 1:
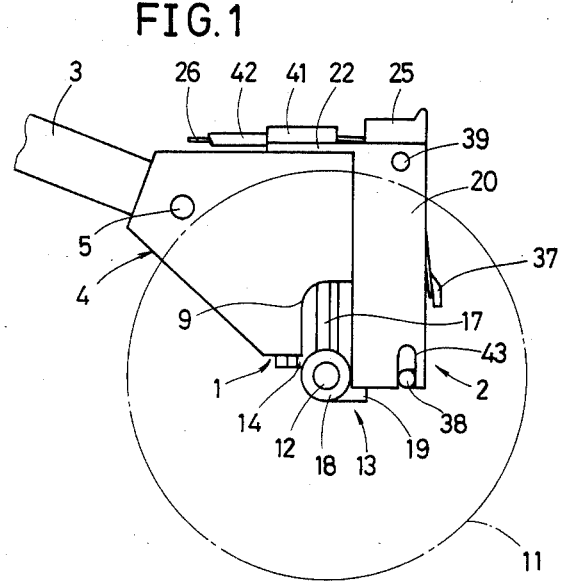
FIG. 1 is a side view showing a region around the lower end of the right-hand side rear leg 3 of a baby carriage having an embodiment of the present invention applied thereto.
Figure 2:
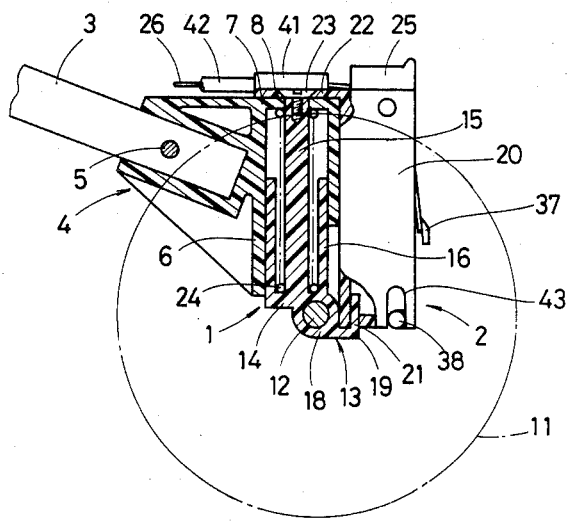
FIGS. 2 to 4 show the construction of a cushioning mechanism 1 constructed as a combination with a wheel stopping mechanism 2 shown in FIG. 1.
Figure 4:
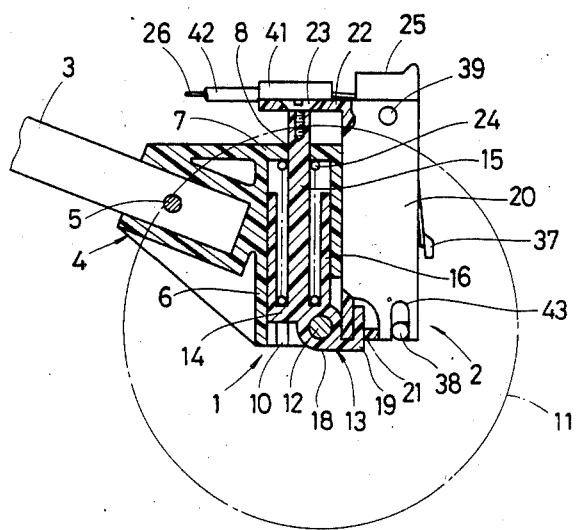

The right-hand rear wheel 11 shown in a dash-dot line in FIGS. 1, 2, and 4 is the outer one of the two wheels attached to the rear leg 3 shown in FIG. 15. These two wheels are rotatably supported on an axle 12, but the inner wheel is omitted from illustration except in FIG. 15. The axle 12 is held by a right-hand wheel attaching member 13, which is molded of resin and has two separate portions. That is, the front portion of the right-hand wheel attaching member 13 forms a slide portion for imparting a cushioning action. The axle 12 is positioned on the slide portion 14 having a section received in the tubular section 6 of said fixed bracket 4, said portion having a central rod 15 of circular cross-section, and a box portion 16 formed therearound, with a cylindrical space defined therebetween. The height of the central rod 15 is so selected that it is received in the throughgoing hole 8. The height of the box portion 16 is so selected that it forms a clearance of predetermined height between it and the upper wall 7 of the fixed bracket 4. This height allows the cushioning action. The outer peripheral surface of the box portion 16 is similar in shape to the inner surface of the tubular section 6 and has vertically extending grooves 17 for receiving the ridges 10. The slide portion 14 has a boss 18 projecting therefrom for receiving the axle 12 therein. The notch 9 enables the boss portion 18 to avoid interfering with the vertical movement of the slide portion 14. An L-shaped engaging piece 19 extends rearwardly from the lower end of the boss 18 of the slide portion 14.

The rear portion of the right-hand attaching member 13 comprises a holding case 20 for holding the wheel stopping mechanism 2. The holding case 20 is mechanically integrated with the slide portion 14 in that its groove 21 formed in the bottom receives said engaging piece 19 while its attaching piece 22 extending forwardly from the upper end thereof is fixed to the upper end of said central rod 15 by a screw 23. The construction of the wheel stopping mechanism installed in connection with the holding case 20 will be described below with reference to FIG. 5 et seq.

A compression spring 24 is disposed in the tubular section 6 of said fixed bracket 4 as it is positioned between the central rod 15 of the slide portion 14 and the box portion 16. The compression spring 24 serves to constantly downwardly urge the slide portion 14 and hence the right-hand side wheel attaching member 13 with respect to the fixed bracket 4, the terminal end of the downward movement thereof being defined by the attaching piece 22 on the holding case 20 abutting against the upper wall 7 of the fixed bracket 4.

In the case shown in FIGS. 1 and 2 there is no compression force acting between the right-hand rear wheel 11 and the right-hand rear leg 3 or, if a compression force is acting therebetween, it is overcome by the resilient force of the compression spring 24. In this case, the attaching piece 22 is abutting against the upper wall 7 and the structure including the right-hand rear wheel 11, axle 12 and right-hand side wheel attaching member 13 is placed at the lowermost position relative to the structure including the right-hand rear leg 3 and the fixed bracket 4.

FIG. 4 shows a state where a force enough to compress the compression spring 24 is applied by the right-hand rear wheel 11 to the right-hand rear leg 3 and where the structure including the right-hand rear wheel 11, axle 12 and right-hand wheel attaching member 13 has been moved upwardly relative to the structure including the right-hand rear leg 3 and fixed bracket 4. Thus, the movement produced between the state shown in FIGS. 1 and 2 and the state shown in FIG. 4 brings about a cushioning action.

The wheel stopping device forming the essence of this invention will now be described. Referring to FIG. 5, an operating member 25 is provided on the side associated with the right-hand rear leg 3, and the right and left wheel stopping mechanisms are interlocked by a wire 26 adapted to be operated by moving said operating member 25.

The holding case 20 forming part of the aforesaid right-hand side wheel attaching member 13 is provided with a pin 29 on which the right-hand L-lever 28 is rotatably supported. One end of the right-hand L-lever 28 has an elongated opening 30 which receives a connecting pin 31 projecting from the end of the right-hand side engaging shaft 27. The right-hand engaging shaft 27 is received in a sleeve 32 on the holding case 20 and is held so that it is movable in a direction parallel to the axle 12. The right-hand engaging shaft 27 has a ridge 33 (FIG. 7) extending lengthwise thereof, while the sleeve 32 has a groove (not shown) extending throughout the length of the sleeve 32 to receive said ridge 33. A respective arrangement is provided on the left side including a projection 33a on the left-hand engaging shaft 27a and the left-hand sleeve 32a. The ridges 33 and 33a on the engaging shafts 27 and 27a and the grooves in the sleeves 32 and 32a receiving these ridges, guide the engaging shafts 27 and 27a to assure a stable movement of the shafts 27, 27a in the sleeves 32 and 32a.

The operating member 25 shown in FIG. 6 is installed so that it contacts the other end of the right-hand L-lever 28. The operating member 25 has a box-like portion in the upper region thereof. The opposite lateral walls of the box-like portion are provided with substantially triangular guide holes 34. Further, the front wall of the box-like portion has a vertically extending relatively long insertion port 35 for passing the wire 26 therethrough. A locking pawl 36 projects forwardly of the front wall of the box-like portion. On the other hand, the lower portion of the operating member 25 is provided with a hook 37 for fixing the end of the wire 26. The lower end of the operating member 25 carries a guide shaft 38 laterally projecting in opposite directions.

The operating member 25 is installed so that it is held between the opposite lateral walls of the holding case 20. In this state, a shaft 39 extending through the guide holes 34 is installed to span the space between the opposite lateral walls of the holding case 20. A pulley 40 is rotatably supported on the shaft 39 and the wire 26 is entrained around the pulley 40. The wire 26 extends through a sleeve 41 on the attaching piece 22. The wire 26 coming out of the sleeve 41 is preferably covered by a flexible tube 42. The end of the flexible tube 42 is inserted into the sleeve 41, where it is fixed.

As shown in FIG. 1 etc. described above, the lower end of the holding case 20 has a vertically extending guide cut 43 in which the respective ends of the guide shaft 38 of the operating member 25 are received for movement, whereby the operating member 25 is vertically movable relative to the holding case 20 by a distance corresponding to the range in which the shaft 39 is movable in the guide holes 34 and corresponding to the range in which the guide shaft 38 is movable in the guide cuts 43.

The aforesaid right-hand L-lever 38 is urged by a right-hand torsion spring 44 to abut against the operating member 25. The torsion spring 44 is held on the pin 29 and engaged at its ends respectively by the holding case 20 and the other end of the right-hand L-lever 28. Therefore, the right-hand L-lever 28, in FIG. 7, is urged to turn counterclockwise around the axis of the pin 29, constantly applying an upward force to the operating member 25. In order to maintain the operating member 25 in the lower position despite such force, the holding case 20 is provided with a locking recess 45 for receiving the aforesaid pawl 36, as shown in FIG. 9.

Figure 9:
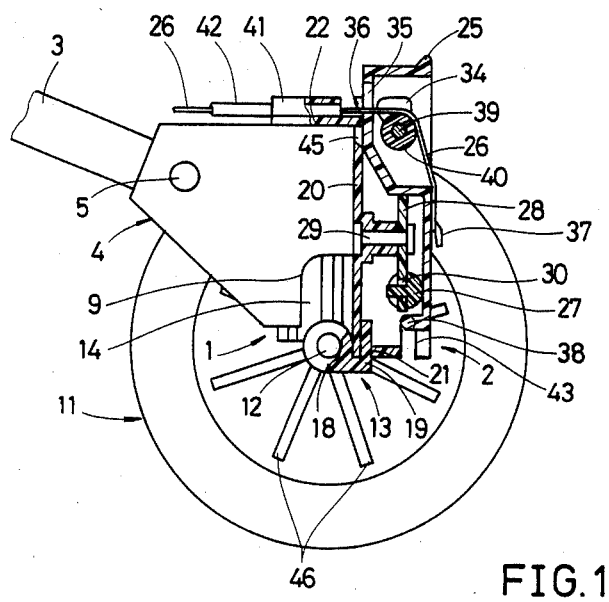
FIGS. 9 to 11 show the wheel stopping state, FIG. 9 corresponds to the upper half of FIG. 5, FIG. 10 corresponds to FIG. 7, and FIG. 11 corresponds to FIG. 8.
Figure 8:
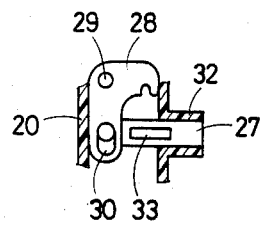
FIG. 8 is a view showing the connection between a right-hand side engaging shaft 27 and a right-hand side L-lever 28 in FIG. 7.
Figure 10:
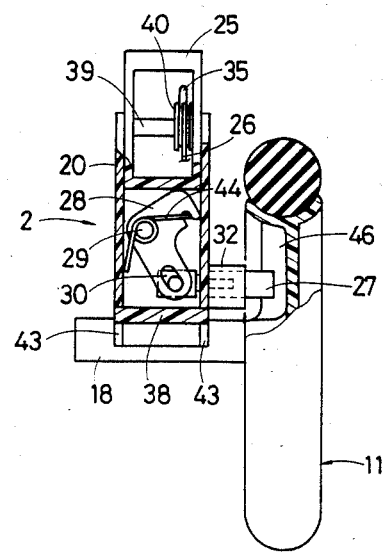

In FIGS. 9 and 10 show the details of the right-hand rear wheel 11, which is provided with a plurality of right-hand side ribs 46 projecting from the lateral surface thereof. As shown in FIG. 10, when the right-hand engaging shaft 27 is moved toward the right-hand ribs 46, the state where it engages a right-hand rib 46 is established.

As shown in the lower half of FIG. 5, the left-hand wheel stopping mechanism 2a is not provided with a member corresponding to the operating member 25. Thus, the left-hand wheel stopping mechanism 2a is somewhat simpler in its arrangement. In addition, in describing the arrangement on the left-hand, the elements corresponding to those included in the right-hand arrangement are denoted by the same reference numerals as used in the description of the right-hand arrangement, plus the letter "a" and only those parts which differ will be described while avoiding repeating the same description.

Figure 12:
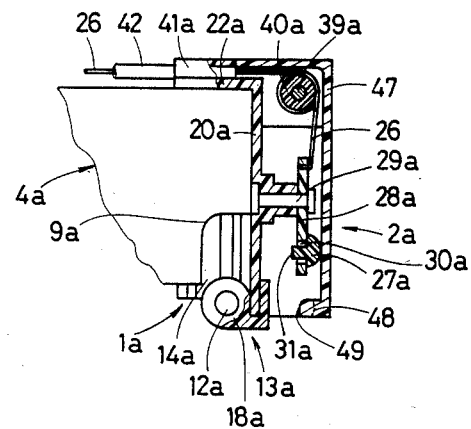
FIGS. 12 to 14 are sectional views of the left-hand wheel stopping mechanism 2a, FIG. 12 is a side view partially in section.
Figure 13:
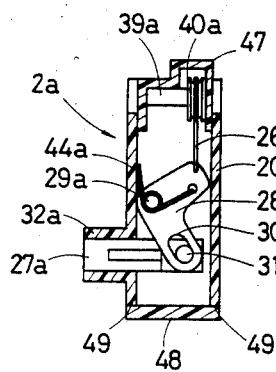
Figure 14:
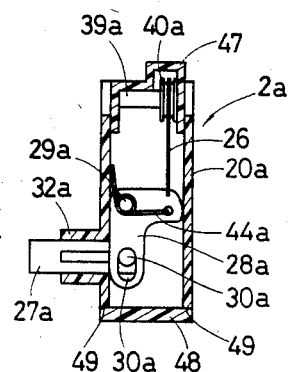

The wire 26 extending from the right-hand wheel stopping mechanism 2, as shown in FIGS. 12 to 14, is directly connected to the left-hand L-lever 28a in the left-hand wheel stopping mechanism 2a. A left-hand torsion spring 44a is installed so that the left-hand L-lever 28a is rotated in a direction imparting tension to the wire 26. More specifically, the left-hand torsion spring 44a is held on the pin 29a, with its ends respectively engaging the holding case 20a and the left-hand L-lever 28a. A cover 47 is fitted to the holding case 20a. The lower end of the cover 47 has a shaft 48 laterally projecting in opposite directions. The respective ends of the shaft 48 are received in the cutouts 49 in the lower end of the holding case 20a while the shaft 39a extends through the opposite lateral walls of the cover 47, whereby the cover 47 is fixed to the holding case 20a.

Referring to all the figures that have been mentioned so far, the method of operating the wheel stopping device and the resulting movements of parts will now be described.

FIGS. 5, 7, 8, 12, and 13 show the wheel rotation permitting state. In this state, the right-hand and left-hand engaging shafts 27 and 27a are not projecting out of the sleeves 32 and 32a and hence they are not engaged with ribs formed on the rear wheels, e.g., ribs 46 shown in FIG. 9. This state is established by resisting the resilient forces of the right-hand and left-hand torsion springs 44 and 44a, and in order to maintain this state, the locking pawl 36 of the operating member 25 is engaged in the locking recess 45 of the right-hand wheel attaching member 13. In this state, the wire 26, which is tensioned by the action of the left-hand side torsion spring 44a, is applying a pushing force, to the left as viewed in FIG. 5, to the operating member 25. Thus, the locking pawl 36 will not be disengaged from the locking recess 45 unless an external force is applied thereto.

Figure 11:
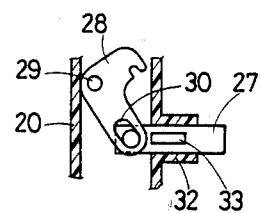

To change the aforesaid wheel rotation permitting state into the wheel stopping state, the operator puts, for example, a foot on the upper surface of the operating member 25 and moves it to the rear namely to the right as viewed in FIG. 5. In response thereto, the operating member 25 is moved by an amount corresponding to the range in which the shaft 39 can horizontally move within the guide holes 34. As a result, the locking pawl 36 comes out of the locking recess 45. Then, since the right-hand side torsion spring 44 is pushing up the operating member 25 through the right-hand L-lever 28 while, at the same time, the left-hand torsion spring 44a is applying tension to the wire 26, and since this tension of the wire 26 acts upwardly at the end of the wire 26 because of the presence of the pulley 40, this force results in the operating member 25 being pulled up, whereby the locking pawl 36 is disengaged from the locking recess 45. Thus, as soon as the foot is removed from the operating member 25 the latter is upwardly moved, so that the state shown in FIGS. 9 and 10 is established. Consequently, as shown in FIGS. 10 and 11, the right-hand L-lever 28 is rotated following the movement of the operating member 25, so that the right-hand engaging shaft 27 connected to one end thereof is projected out of the sleeve 32. In this state, as shown in FIG. 10, the right-hand engaging shaft 27 engages the rib 46 thereby locking the rear wheel 11 against rotation.

On the other hand, in the left-hand region, the aforesaid upward movement of the operating member 25 causes the wire 26 to move a predetermined distance toward the left-hand wheel stopping mechanism 2a. At this time, since a tension is constantly applied to the wire 26 by the left-hand torsion spring 44a, the left-hand L-lever 28 is rotated following the movement of the wire 26, thus projecting the left-hand engaging shaft 27a out of the sleeve 32a. Although the left-hand rear wheel is omitted in the figure showing the left-hand, it will be seen that when the left-hand engaging shaft 27a is projected in this manner, it engages the rib on the left-hand wheel thereby also locking it against rotation. The left-hand rear wheel described herein may be understood to be the wheel indicated at 11a in FIG. 15.

To change such wheel stopping or locking state back into the wheel rotation permitting state, it is only necessary to downwardly push in the operating member 25. In response thereto, the locking pawl 36 engages the locking recess 45, whereby the wheel locking is removed and rotation is permited.

While the invention has so far been described with reference to a particular embodiment thereof, this embodiment may be modified at various portions thereof.

For example, the torsion springs 44 and 44a provided to the L-levers 28 and 28a may be replaced by tension springs or compression springs.

While the operating member 25 has been constructed so that in its movement, at least the upper portion thereof is movable not only up and down but also back and forth, it may be so constructed that it is movable only up and down. In this case, the shape of the locking means comprising the locking pawl 36 and the locking recess 45 would have to be more or less changed. For example, it would be necessary to reduce the extent of projection of the member corresponding to the locking pawl or to provide an elastically deformable portion in this locking member.

Further, while the aforesaid embodiment has been provided with cushioning mechanisms 1 and 1a, such cushioning mechanisms are not essential, and the wheel attaching member and the rear leg may be fixedly connected together.

While this invention is advantageously applicable to collapsible baby carriages and the like, it is applicable also to baby carriages and the like having no such collapsing function.

Although the present invention has been described and illustrated in detail, it is clearly understood that the same is by way of illustration and example only and is not to be taken by way of limitation, the scope of the present invention being limited only by the terms of the appended claims.

What is claimed is:

1. In a wheel stopping device including first and second wheel engaging shafts (27, 27a) movable in parallel to axles (12, 12a) of first and second wheels (11, 11a) disposed at two different locations, and first and second ribs (46) projecting from lateral surfaces of said first and second wheels (11, 11a), wherein, when said first engaging shaft (27) is moved toward and engages said first rib (46) for locking said first wheel against rotation, in operative association therewith, said second engaging shaft (27a) is also moved toward and engages said second rib for locking said second wheel also against rotation, and wherein said first and second engaging shafts also return together to their original state for permitting wheel rotation, the improvement comprising first and second L-levers (28, 28a), said first and second engaging shafts (27, 27a) being connected to one of the respective ends of said first and second L-levers (28, 28a), first and second wheel attaching members (13, 13a) for attaching said first and second wheels (11, 11a) and for rotatably supporting said L-levers, respectively, an operating member (25) movably attached to said first wheel attaching member (13) so that said operating member abuts against the other end of said first L-lever (28), a first spring (44) arranged for urging said first L-lever (28) against said operating member (25), whereby said first engaging shaft (27) is moved toward and away from said first rib (46) in response to movement of said operating member (25) causing rotation of said first L-lever (28), a wire (26) connected between said operating member (25) and said second L-lever (28a) for transmitting movement of said operating member (25) to the second L-lever (28a) for rotating said second L-lever (28a) in synchronism with said first engaging shaft (27), whereby said second engaging shaft (27a) is moved toward and away from said second rib, a second spring (44a) arranged for cooperation with said second L-lever (28a) for urging said second L-lever to rotate in the direction in which the second L-lever (28a) imparts tension to said wire (26) in response to movement of said operating member (25) in a direction for rotating said first L-lever (28) against the resilience of said first spring (44), whereby said first engaging shaft (27) is moved away from said first rib (46) while the force transmitted through said wire (26) rotates said second L-lever (28a) against the resilience of said second spring (44a) so as to move said second engaging shaft (27a) away from said second rib for permitting wheel rotation, and locking members (36, 45) operatively arranged for cooperation with said first and second springs (44, 44a) for locking said operating member (25) against moving relative to said first wheel attaching member (13) for maintaining a wheel rotation permitting state, and means for cancelling the locking by said locking members (36, 45) whereby said first and second springs (44, 44a) cause said first and second engaging shafts (27, 27a) to move toward said first and second ribs (46) for again establishing a wheel locking state, and wherein said operating member (25) comprises guide shaft means (38) extending laterally away from said operating member, guide holes (34) laterally extending through said operating member, and a guide member (39) operatively held by said guide holes (34) for guiding said wire (26), said first wheel attaching member (13) having guide cuts (43) for operatively receiving said guide shaft means (38), whereby said operating member (25) is movable relative to said first wheel attaching member (13) through a displacement range defined by said guide holes (34) holding said guide member (39) for said wire and by said guide cuts (43) in which said guide shaft means (38) is movable.

2. The wheel stopping device of claim 1, wherein said first and second springs (44, 44a) are torsion springs.

3. The wheel stopping device of claim 1, further comprising a flexible tube (42), said wire (26) being inserted in said flexible tube (42) which is fixed at its ends to the first and second wheel attaching members (13, 13a).

4. The wheel stopping device of claim 1, wherein said first and second wheel attaching members (13, 13a) comprise respective sleeves (32, 32a) for guiding the movement of said first and second engaging shafts (27, 27a).

5. The wheel stopping device of claim 4, wherein said first and second engaging shafts (27, 27a) comprise respective axially extending ridges (33, 33a), said sleeves (33, 33a) comprising grooves (32, 32a) for receiving said ridges (33, 33a).

6. The wheel stopping device of claim 1, wherein said guide member (39) for said wire (26) comprises a shaft (39) and a pulley (40) rotatably carried by said shaft, said wire being entrained around said pulley (40).

7. The wheel stopping device of claim 1, wherein the tension imparted to said wire (26) by said second spring (44a) acts on said operating member (25) in a direction for maintaining the locking state of said locking members (36, 45).

8. The wheel stopping device of claim 1, wherein said wheel stopping device is applied to the wheels (11, 11a) of a baby carriage.

9. The wheel stopping device of claim 8, further including fixed brackets (4, 4a) fixedly attached to leg members (3, 3a) of said baby carriage, tubular sections (6) formed as portions of said fixed brackets (4, 4a) to define vertically extending spaces having an open bottom and a substantially closed top, slide portions (14) forming part of said wheel attaching members (13, 13a) inserted from below into said spaces of said tubular section (6), said slide portions (14) being vertically slidable, coiled compression springs (24) for exerting resilient forces between said fixed brackets (4, 4a) and said wheel attaching members (13, 13a), said top of each tubular section (6) including an upper wall (7) with a throughgoing hole (8) smaller in cross-section than said space and substantially aligned with a central axis, said slide portion (14) comprising a central rod (15) having its upper end received in said throughgoing hole (8), a box portion (16) around said central rod (15) to define therebetween a top-opened, bottom-closed space and contacted with the inner peripheral surface of said tubular section (6), and a stopper (22) for defining the terminal end of the downward movement of said central rod (15) with the upper end of the central rod (15) received in said throughgoing hole (8), whereby, when said central rod (15) is brought to the terminal position of its downward movement, a clearance of predetermined height is provided for allowing a cushioning action between the upper end of said box portion (16) and the lower surface of said upper wall (7), each of said compression springs (24) having its lower end positioned between said central rod (15) and said box portion (16) and its upper end in contact with the lower surface of said upper wall (7).

10. The wheel stopping device of claim 9, wherein the outer peripheral surface of the box portion (16) of said slide portion (4) and the inner peripheral surface of said tubular section (6) comprise ridges (10) and grooves (17) which form pairs and extend vertically.

* * * * *